United States Patent
Tsai (10) Patent No.: US 10,824,069 B2
(45) Date of Patent: Nov. 3, 2020

(54) PROJECTION APPARATUS AND ILLUMINATION SYSTEM

(71) Applicant: Coretronic Corporation, Hsin-Chu (TW)

(72) Inventor: Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/351,531

(22) Filed: Mar. 13, 2019

(65) Prior Publication Data

US 2019/0285976 A1 Sep. 19, 2019

(30) Foreign Application Priority Data

Mar. 14, 2018 (CN) .......................... 2018 1 0210140
Nov. 2, 2018 (CN) ...................... 2018 2 1800569 U (51) Int. Cl.
*G03B 21/20* (2006.01)
*G02B 3/00* (2006.01)
(Continued)

(52) U.S. Cl.
CPC ......... *G03B 21/208* (2013.01); *G02B 3/0006* (2013.01); *G02B 13/16* (2013.01);
(Continued)

(58) Field of Classification Search
CPC .............. G03B 21/208; G03B 21/2033; G02B 3/0006; G02B 27/1006; G02B 27/30
(Continued)

(56) References Cited

U.S. PATENT DOCUMENTS

2012/0242912 A1    9/2012  Kitano
2017/0059976 A1*   3/2017  Wang .................. H04N 9/3161
(Continued)

FOREIGN PATENT DOCUMENTS

CN          100374905          3/2008
CN          102707551          4/2015
(Continued)

OTHER PUBLICATIONS

Machine Translation of WO2014109333A1 (Year: 2020).*
"Office Action of Taiwan Counterpart Application," dated Apr. 8, 2019, p. 1-p. 5.

*Primary Examiner* — Jerry L Brooks
(74) *Attorney, Agent, or Firm* — JCIPRNET (57) ABSTRACT

A projection apparatus and an illumination system thereof are provided. The illumination system includes a light source device, a light homogenization device, an optical transmission module, and an optical wavelength conversion module. The light homogenization device is disposed on a transmission path of a light source beam from the light source device. The optical transmission module is disposed on a transmission path of the light source beam from the light homogenization device. The optical wavelength conversion module is disposed on a transmission path of the light source beam from the optical transmission module and is configured to convert a first portion of the light source beam into a converted light beam. The converted light beam and a second portion of the light source beam form an illumination light beam. The light homogenization device is disposed outside a transmission path of the illumination light beam.

12 Claims, 5 Drawing Sheets

(51) Int. Cl.
  *G02B 27/30* (2006.01)
  *G02B 27/10* (2006.01)
  *G02B 13/16* (2006.01)

(52) U.S. Cl.
  CPC ......... *G02B 27/1006* (2013.01); *G02B 27/30* (2013.01); *G03B 21/2033* (2013.01)

(58) Field of Classification Search
  USPC .......................................................... 353/31
  See application file for complete search history.

(56) References Cited

U.S. PATENT DOCUMENTS

| | | | |
|---|---|---|---|
| 2017/0139312 A1* | 5/2017 | Kato | H04N 9/3185 |
| 2017/0199450 A1* | 7/2017 | Matsubara | G03B 21/142 |
| 2018/0095350 A1* | 4/2018 | Tanaka | F21V 14/08 |

FOREIGN PATENT DOCUMENTS

| | | | | |
|---|---|---|---|---|
| TW | 201111897 | | 4/2011 | |
| WO | 2014109333 | | 7/2014 | |
| WO | WO 2014109333 | * | 7/2014 | ......... G03B 21/2066 |

* cited by examiner

PROJECTION APPARATUS AND ILLUMINATION SYSTEM

CROSS-REFERENCE TO RELATED APPLICATION

This application claims the priority benefits of China application serial no. 201810210140.X, filed on Mar. 14, 2018 and China application serial no. 201821800569.6, filed on Nov. 2, 2018. The entirety of the above-mentioned patent applications are hereby incorporated by reference herein and made a part of this specification.

BACKGROUND OF THE INVENTION

Field of the Invention

The invention relates to an imaging apparatus and an optical system. More particularly, the invention relates to a projection apparatus and an illumination system.

Description of Related Art

In a conventional projection apparatus, a light homogenization element is disposed between an illumination system and a light valve for increasing the uniformity of the illumination light beam. In addition, an optical system is further disposed between the light homogenization element and the light valve for increasing light utilization. In this way, a projection effect featuring high uniformity and high brightness is achieved. Nevertheless, the optical system generally includes a considerable number of lenses and prism sets. Absorption or reflection of light beams by an element itself, or a mismatch in optically coupling multiple elements may all lead to efficiency loss, and that may be worse in case of more optical elements. In addition, the number of the elements may also have an effect on the cost and volume of the projection apparatus.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention was acknowledged by a person of ordinary skill in the art.

SUMMARY OF THE INVENTION

The invention provides a projection apparatus and an illumination system thereof which may favorable in less efficiency loss, lower cost, and a reduced volume.

Other objects and advantages of the invention can be further illustrated by the technical features broadly embodied and described as follows.

In order to achieve one or a portion of or all of the objects or other objects, an embodiment of the invention provides a projection apparatus, which includes an illumination system, a light valve, and a projection lens. The illumination system includes a light source device, a light homogenization device, an optical transmission module, and an optical wavelength conversion module. The light source device is configured for providing a light source beam. The light homogenization device is disposed on a transmission path of a light source beam from the light source device. The optical transmission module is disposed on a transmission path of the light source beam from the light homogenization device. The optical wavelength conversion module is disposed on a transmission path of the light source beam from the optical transmission module and is configured to convert a first portion of the light source beam into a converted light beam. A wavelength of the converted light beam is different from a wavelength of the light source beam. The converted light beam and a second portion of the light source beam form an illumination light beam. The light homogenization device is disposed outside a transmission path of the illumination light beam. The light valve is disposed on the transmission path of the illumination light beam and is configured to convert the illumination light beam into an image light beam. The projection lens is disposed on the transmission path of the image beam.

In order to achieve one or a portion of or all of the objects or other objects, an embodiment of the invention provides an illumination system, which includes a light source device, a light homogenization device, an optical transmission module, and an optical wavelength conversion module. The light source device is configured for providing a light source beam. The light homogenization device is disposed on a transmission path of a light source beam from the light source device. The optical transmission module is disposed on a transmission path of the light source beam from the light homogenization device. The optical wavelength conversion module is disposed on a transmission path of the light source beam from the optical transmission module and is configured to convert a first portion of the light source beam into a converted light beam. A wavelength of the converted light beam is different from a wavelength of the light source beam. The converted light beam and a second portion of the light source beam form an illumination light beam. The light homogenization device is disposed outside a transmission path of the illumination light beam.

To sum up, the embodiments of the invention have at least one of the following advantages or effects. In the projection apparatus provided by one of the embodiments of the invention, the light source beam from the light source device is optimized (light homogenizing and shaping) by the light homogenization device and the optical transmission module before being transmitted to the optical wavelength conversion module. As such, the shape of a speckle formed on the optical wavelength conversion module matches the shape of a speckle formed on the light valve. Hence, between the optical wavelength conversion module and the light valve, a light homogenization element and a optical system may be omitted. In such a configuration, the projection apparatus provided by one of the embodiments of the invention may be favorable in less efficiency loss, lower cost, and a reduce volume.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
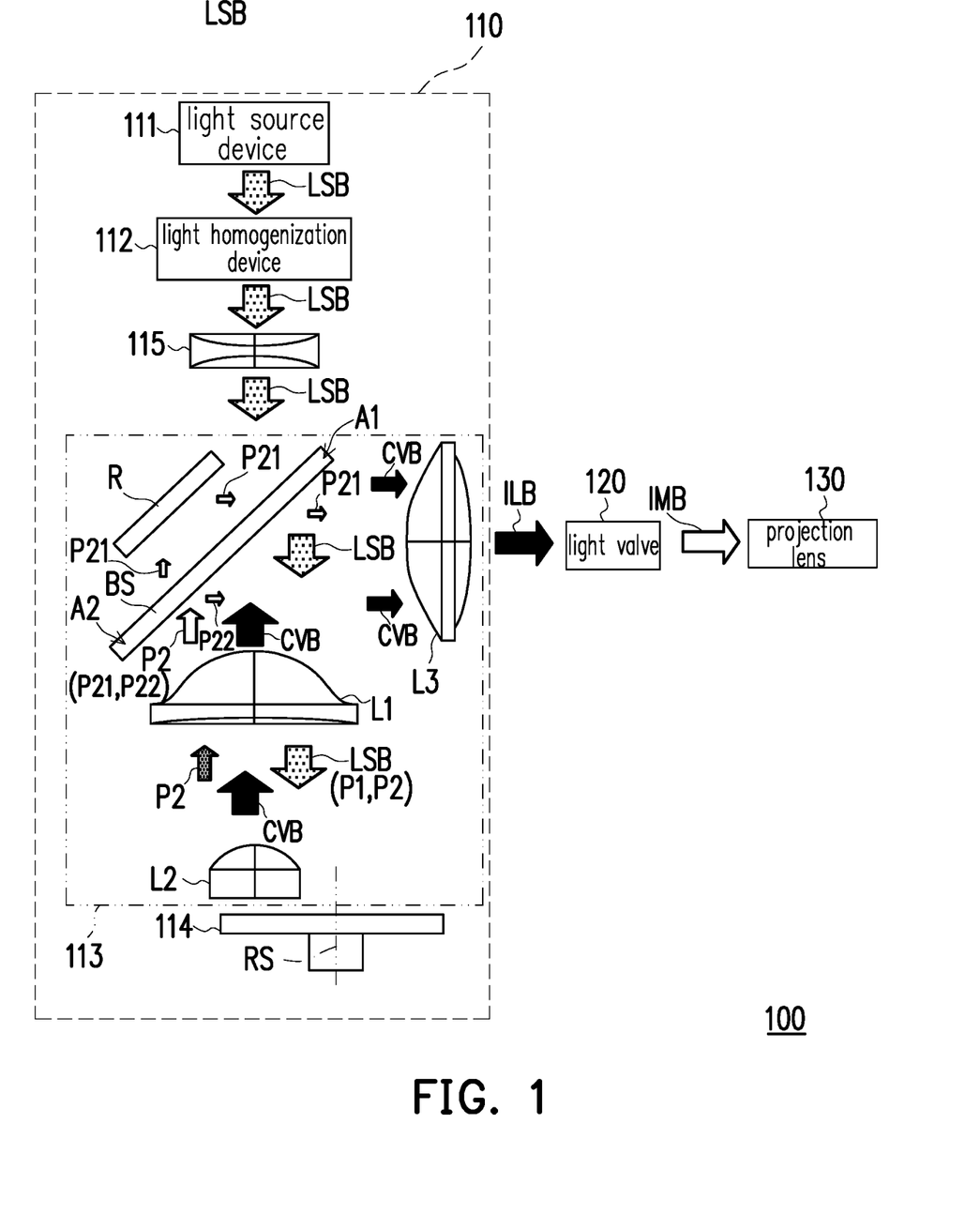
FIG. 1 is a schematic view of a projection apparatus according to an embodiment of the invention.

FIG. 1 is a schematic view of a projection apparatus according to an embodiment of the invention. With reference to FIG. 1, a projection apparatus 100 provided by the embodiment of the invention includes an illumination system 110, a light valve 120, and a projection lens 130.

The illumination system 110 is configured for providing an illumination light beam ILB. To be specific, the illumination system 110 includes a light source device 111, a light homogenization device 112, an optical transmission module 113, and an optical wavelength conversion module 114.

The light source device 111 provides a light source beam LSB. To be specific, the light source device 111 may include a plurality of light emitting elements (not shown). A plurality of sub-beams emitted by the light emitting elements form the light source beam LSB. For instance, the light emitting elements may be a plurality of laser diodes, a plurality of light emitting diodes, or other solid-state light sources. In some embodiments, the light emitting elements may also be a combination of the laser diodes and the light emitting diodes.

The light homogenization device 112 is disposed on a transmission path of the light source beam LSB from the light source device 111. The light homogenization device 112 may be used to homogenizing and shaping a light beam. For instance, the light homogenization device 112 may include a diffraction optical element (DOE), a holographic optical element (HOE), an integration rod, or a lens array element. In some embodiments, the light homogenization device 112 may also be a combination of the lens array element and a convex lens. Two opposite surfaces of the lens array element may both be lens array surfaces, or the two opposite surfaces of the lens array element may respectively be a lens array surface and a convex surface.

When the two opposite surfaces of the lens array element both are the lens array surfaces, each of the lens array surfaces may comprise a plurality of convex surfaces. On the other hand, when the two opposite surfaces of the lens array element respectively are a lens array surface and a convex surface, the lens array surface may comprise a plurality of convex surfaces or a plurality of concave surfaces. Further, the light homogenization device 112 may be configured for converging (or constricting) the light source beam LSB and overlapping a plurality of speckles corresponding to the sub-beams. By focusing the speckles in a specifically-shaped region (e.g., corresponding to a shape of a speckle to be formed on the light valve 120), a local brightness difference of the light source beam LSB in the region is reduced, so as to achieve the light homogenization and shaping effect.

In this embodiment, the illumination system 110 may further include a concave lens 115. The concave lens 115 may be located between the light homogenization device 112 and the optical transmission module 113. In this way, the light homogenization device 112 converges the light source beam LSB from the light source device 111 to the concave lens 115. Next, the concave lens 115 collimates the light source beam LSB from the light homogenization device 112 and transmits the collimated light source beam LSB towards the optical transmission module 113. That is, after passing through the concave lens 115, the light source beam LSB forms a parallel light or a nearly parallel light beam transmitting towards the optical transmission module 113 in this embodiment.

In another embodiment, the light homogenization device 112 may be located between the concave lens 115 and the optical transmission module 113. That is, the concave lens 115 is disposed on the transmission path of the light source beam LSB from the light source device 111. Next, the concave lens 115 collimates the light source beam LSB converged to the concave lens 115 and transmits the collimated light source beam LSB towards the light homogenization device 112.

The optical transmission module 113 is disposed on a transmission path of the light source beam LSB from the light homogenization device 112. In the structure presented in FIG. 1, the light source beam LSB from the light source device 111 passes through the light homogenization device 112 and the concave lens 115 in sequence and then is transmitted to the optical transmission module 113. On the other hand, when positions of the concave lens 115 and the light homogenization device 112 in FIG. 1 are reversed, the light source beam LSB from the light source device 111 passes through the concave lens 115 and the light homogenization device 112 in sequence and then is transmitted to the optical transmission module 113.

A number of the optical elements and locations of the optical elements in the optical transmission module 113 may be changed according to requirement or system configuration. In this embodiment, the optical wavelength conversion module 114 and the light valve 120 are respectively located at two adjacent sides of the optical transmission module 113. The optical transmission module 113 includes a beam splitter BS and a reflector R. The beam splitter BS is disposed on the transmission path of the light source beam LSB from the light homogenization device 112. In this embodiment, the light source beam LSB is, for example, a blue light beam, but the invention is not limited thereto. In this embodiment, a partial region of the beam splitter BS is configured for allowing the entire light source beam LSB to pass through. In this embodiment, another partial region of the beam splitter BS is configured for reflecting part of the light source beam LSB and is configured for allowing part of the light source beam LSB to pass through.

As described above, a first region A1 of the beam splitter BS is configured for allowing a first portion P1 and a second portion P2 of the light source beam LSB to pass through in this embodiment.

The optical wavelength conversion module 114 is disposed on a transmission path of the light source beam LSB (including the first portion P1 and the second portion P2 of the light source beam LSB passing through the first region A1 of the beam splitter BS) from the optical transmission module 113. Moreover, the optical wavelength conversion module 114 is configured for converting the first portion P1 of the light source beam LSB into a converted light beam CVB, wherein a wavelength of the converted light beam CVB is different from a wavelength of the light source beam LSB. In this embodiment, the converted light beam CVB is, for example, a yellow light beam, but the invention is not limited thereto. The optical wavelength conversion module 114 is further configured for transmitting the converted light beam CVB back to the beam splitter BS. The first region A1 and the second region A2 of the beam splitter BS are further configured for reflecting the converted light beam CVB.

Specifically, the optical wavelength conversion module 114 may include an optical conversion layer (not shown) configured for converting the first portion P1 of the light source beam LSB into the converted light beam CVB and a rotary disc (not shown) configured for carrying the optical conversion layer. The optical conversion layer may include phosphors, quantum dots, or a combination of the phosphors and the quantum dots. The second portion P2 of the light source beam LSB passing through the first region A1 of the beam splitter BS may be reflected back to the optical transmission module 113 through the rotary disc or a reflection layer on the rotary disc without additional elements configured for transmitting the second portion P2 of the light source beam LSB back to the optical transmission module 113. As such, costs and a volume of the projection apparatus 100 may be reduced, and efficiency may be improved. In this embodiment, the optical wavelength conversion module 114 has a reflection region (not shown) and at least one conversion region (not shown). The reflection region is configured for reflecting the second portion P2 of the light source beam LSB. The optical conversion layer (e.g., phosphors or quantum dots) is disposed in the at least one conversion region, so as to convert the first portion P1 of the light source beam LSB into the converted light beam CVB.

In addition, the second region A2 of the beam splitter BS is configured for allowing a partial light beam in the second portion P2 of the light source beam LSB to pass through and configured for reflecting another partial light beam in the second portion P2 of the light source beam LSB. In other words, for the light source beam LSB, the second region A2 of the beam splitter BS is a partially penetrating and partially reflective element. In addition, the reflector R is disposed on a transmission path of the partial light beam of the light source beam LSB from the beam splitter BS (the second region A2) and is configured for reflecting the partial light beam of the light source beam LSB from the beam splitter BS (the second region A2) back to the beam splitter BS (the first region A1).

To be specific, the rotary disc rotates around a rotating shaft RS, such that the reflection region and the at least one conversion region of the optical wavelength conversion module 114 alternately cut into the transmission path of the light source beam LSB from the optical transmission module 113. Therefore, the light source beam LSB may alternately illuminate on the reflection region and the conversion region of the optical wavelength conversion module 114.

The first portion P1 of the light source beam LSB refers to the light source beam LSB illuminating onto the conversion region of the optical wavelength conversion module 114, and the second portion P2 of the light source beam LSB refers to the light source beam LSB illuminating onto the reflection region of the optical wavelength conversion module 114. More specifically, in the embodiment, when the conversion region of the optical wavelength conversion module 114 cuts into the transmission path of the light source beam LSB during the rotation of the optical wavelength conversion module 114, the light source beam LSB illuminating onto the conversion region of the optical wavelength conversion module 114 is referred as the first portion P1, and such light source beam LSB is converted into the converted light beam CVB by the conversion region of the optical wavelength conversion module 114. Moreover, in the embodiment, when the reflection region of the optical wavelength conversion module 114 cuts into the transmission path of the light source beam LSB during the rotation of the optical wavelength conversion module 114, the light source beam LSB illuminating onto the reflection region of the optical wavelength conversion module 114 is referred as the second portion P2. That is, phases "the first portion of the light source beam" and "the second portion of the light source beam" referred in the specification and claims of the application may not imply that the light source beam includes two kinds of light or two beams of light. These phases may rather mean that the same light source beam from the light source device 111 illuminates onto the optical wavelength conversion module 114 at different time points. For example, the same light source beam from the light source device 111 alternately illuminates onto the reflection region and the conversion region of the optical wavelength conversion module 114 at different time points. In order to describe the light source beam illuminating onto the optical wavelength conversion module 114 at different time points, phases "the first portion of the light source beam" and "the second portion of the light source beam" may be referred. Briefly speaking, the first portion of the light source beam refers to the light source beam LSB illuminating onto the conversion region of the optical wavelength conversion module 114, and the second portion of the light source beam refers to the light source beam LSB illuminating onto the reflection region of the optical wavelength conversion module 114.

When the reflection region of the optical wavelength conversion module 114 cuts into the transmission path of the light source beam LSB from the optical transmission module 113, the light beam incident on the reflection region is the second portion P2 of the light source beam LSB, and the second portion P2 of the light source beam LSB is reflected back to the second region A2 of the beam splitter BS by the optical wavelength conversion module 114 (the rotary disc or the reflection layer on the rotary disc). The second region A2 of the beam splitter BS is configured for allowing a first sub-portion P21 in the second portion P2 of the light source beam LSB from the optical wavelength conversion module 114 to pass through and is configured for reflecting a second sub-portion P22 in the second portion P2 of the light source beam LSB. Next, the first sub-portion P21 in the second portion P2 of the light source beam LSB is reflected by the reflector R and thus is transmitted to the first region A1 of the beam splitter BS and passes through the first region A1 of the beam splitter BS. The first sub-portion P21 penetrating the first region A1 of the beam splitter BS and the second sub-portion P22 reflected by the second region A2 of the beam splitter BS are then transmitted to the light valve 120. When the conversion region of the optical wavelength conversion module 114 cuts into the transmission path of the light source beam LSB from the optical transmission module 113, the light beam incident on the conversion region is the first portion P1 of the light source beam LSB, and the first portion P1 of the light source beam LSB is converted into the converted light beam CVB by the optical wavelength conversion module 114. The converted light beam CVB is reflected by the rotary disc or the reflection layer on the rotary disc and thus is transmitted to the beam splitter BS. The converted light beam CVB is then reflected by the first region A1 and the second region A2 of the beam splitter BS and thus is transmitted to the light valve 120.

The converted light beam CVB and the second portion P2 (the first sub-portion P21 and the second sub-portion P22) of the light source beam LSB form the illumination light beam ILB. For instance, the light source beam LSB is a blue light beam, and the converted light beam CVB is a yellow light beam. Nevertheless, colors of the light source beam LSB and the converted light beam CVB are merely exemplary and are not used to limit the invention.

The optical transmission module 113 may further include other elements according to different requirements. For instance, the optical transmission module 113 may further include a plurality of lens elements such as a lens element L1, a lens element L2, and a lens element L3, but the invention is not limited thereto. The lens element L1 is disposed between the beam splitter BS and the optical wavelength conversion module 114. The lens element L2 is disposed between the lens element L1 and the optical wavelength conversion module 114. The lens element L3 is disposed between the beam splitter BS and the light valve 120. In an embodiment, an anti-reflection (AR) layer may further be disposed on the beam splitter BS. The anti-reflection layer is located between the beam splitter BS and the reflector R and is used to reduce the loss caused by surface reflection.

The light valve 120 is disposed on a transmission path of the illumination light beam ILB, and the light valve 120 is configured for converting the illumination light beam ILB into an image light beam IMB. For instance, the light valve 120 may include a liquid crystal display (LCD) panel, a liquid crystal on silicon (LCOS) panel, or a digital micro-mirror device (DMD), but the invention is not limited thereto.

The projection lens 130 is disposed on a transmission path of the image light beam IMB, and the projection lens 130 projects the image light beam IMB onto an imaging plane (not shown).

In this embodiment, the light homogenization device 112 is disposed outside the transmission path of the illumination light beam ILB. In other words, the illumination light beam ILB does not pass through the light homogenization device 112 during the transmission towards the light valve 120. Specifically, in the projection apparatus 100, light homogenization and shaping of the light source beam LSB from the light source device 111 is performed by the light homogenization device 112 before the light source beam LSB from the light source device 111 is transmitted to the optical wavelength conversion module 114. A shape of a speckle is further optimized through the optical transmission module 113. As such, a shape of a speckle formed on the optical wavelength conversion module 114 matches with a shape of a speckle formed on the light valve 120. Specifically, the shape of the speckle on the light valve 120 is substantially equal to or similar to the shape of the speckle on the optical wavelength conversion module 114 (e.g., both are rectangular), and a size of a speckle on the light valve 120 is greater than a size of a speckle on the optical wavelength conversion module 114. Hence, no light homogenization device nor light homogenization element is required to be disposed between the optical wavelength conversion module 114 and the light valve 120. Thus, a light homogenization device or a light homogenization element disposed between an optical wavelength conversion module and a light valve in a conventional projection apparatus may be replaced by the light homogenization device 112 of this embodiment. Comparing to the conventional projection apparatus, the projection apparatus 100 requires considerably less optical elements. The transmission paths in the projection apparatus 100 may also be simplified, as such, loss of efficiency, costs, and volume may be effectively reduced. In addition, since the speckle formed on the optical wavelength conversion module 114 has a more uniform light shape, conversion efficiency of the optical wavelength conversion module 114 is increased, and the optical conversion layer is also avoided from being burned out.

Figure 2A:
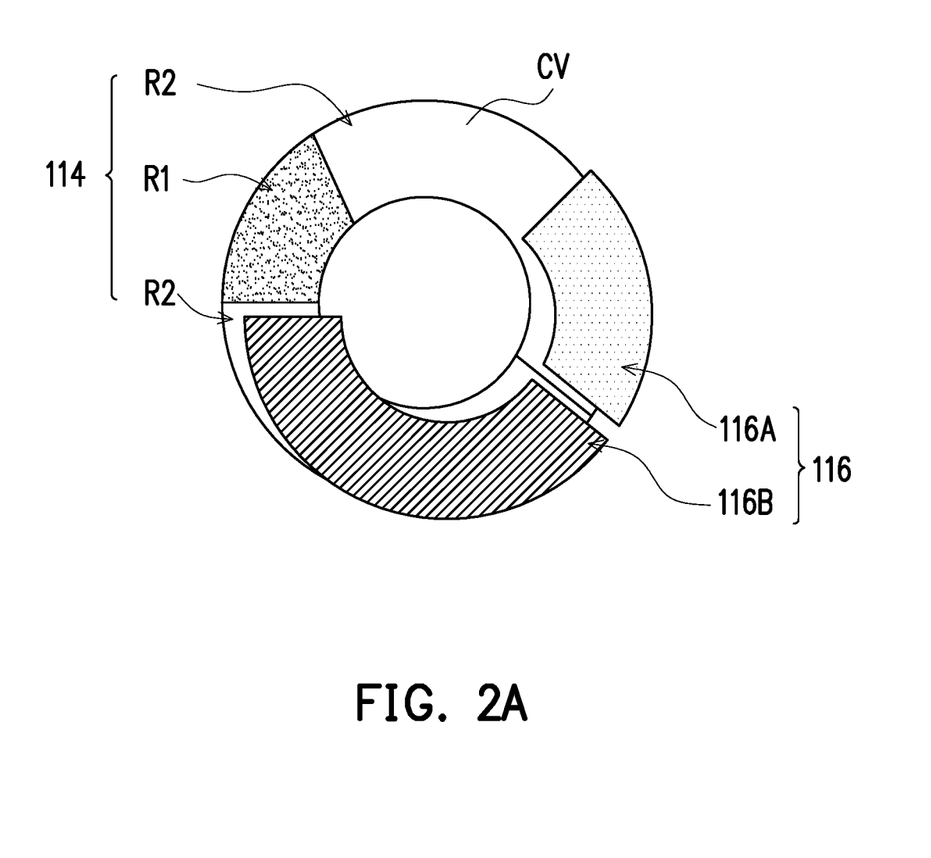
FIG. 2A is a schematic exploded top view illustrating an optical wavelength conversion module and a filter module suitable for a projection apparatus of the invention.
Figure 2B:
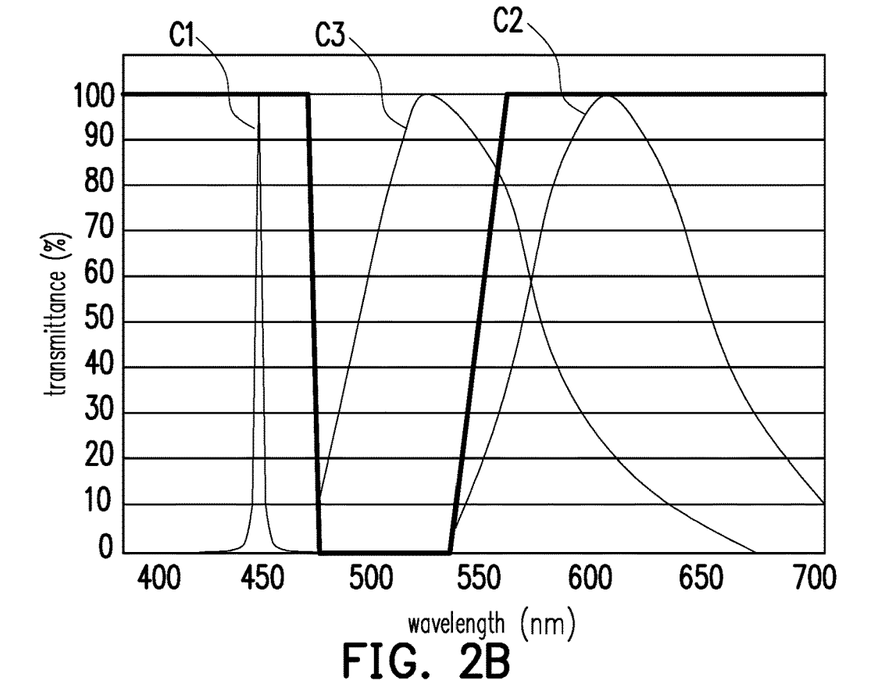
FIG. 2B and FIG. 2C are respectively graphs showing the relationship between the wavelength and the transmittance of a first filter element and a second filter element illustrated in FIG. 2A.
Figure 2C:
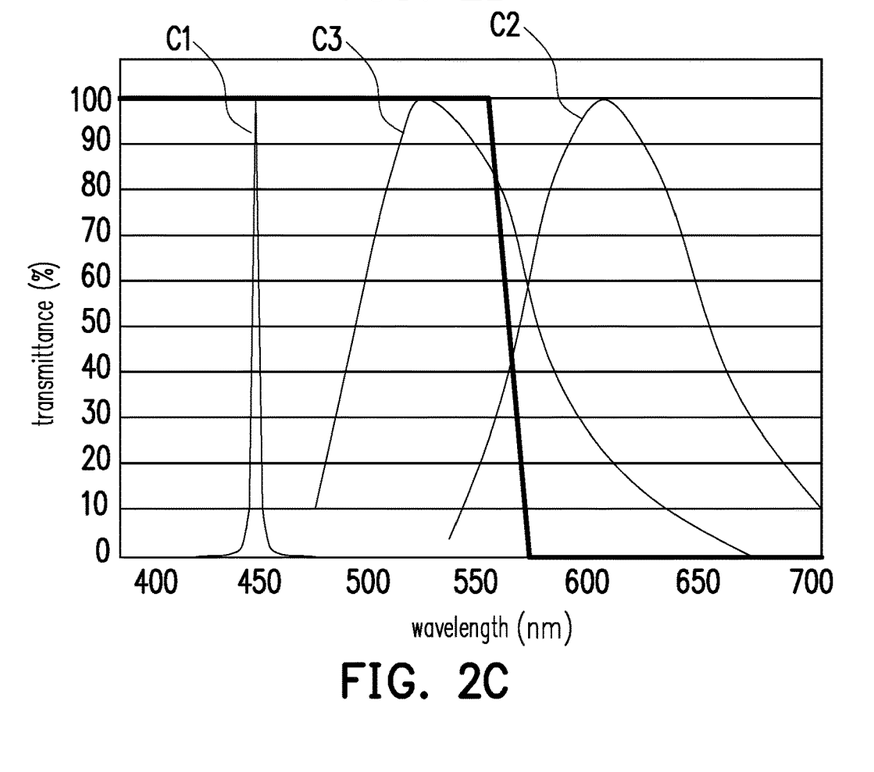

FIG. 2A is a schematic exploded top view illustrating an optical wavelength conversion module and a filter module applied to a projection apparatus of the invention. FIG. 2B and FIG. 2C are respectively graphs showing the relationship between the wavelength and the transmittance of a first filter element and a second filter element illustrated in FIG. 2A. In FIG. 2B and FIG. 2C, a curve C1 represents a spectrum of a blue light corresponding to the light source beam LSB, a curve C2 represents a spectrum of a red light corresponding to a first converted light beam, and a curve C3 represents a spectrum of a green light corresponding to a second converted light beam.

With reference to FIG. 2A to FIG. 2C, the illumination system may further include a filter module 116 in an embodiment. The filter module 116 includes at least one filter element. FIG. 2A illustrates that the filter module 116 includes a first filter element 116A and a second filter element 116B. However, the actual number of the filter elements in the filter module 116 may be changed according to requirement and the invention is not limited thereto.

The first filter element 116A and the second filter element 116B are disposed on an optical conversion layer CV and are respectively located in two conversion regions R2 of the optical wavelength conversion module 114. In addition, the first filter element 116A and the second filter element 116B expose a reflection region R1 of the optical wavelength conversion module 114. As shown by the thick solid line in FIG. 2B, the first filter element 116A is configured for allowing the light source beam (e.g., the blue light beam) and the first converted light beam (e.g., the red light beam) to pass through and for filtering out light beams of other colors. As shown by the thick solid line in FIG. 2C, the second filter element 116B is configured for allowing the light source beam (e.g., the blue light beam) and the second converted light beam (e.g., the green light beam) to pass through and for filtering out light beams of other colors.

In an embodiment, the filter module 116 may be disposed on the optical wavelength conversion module 114. In an embodiment, the filter module 116 may be disposed at any location between the optical wavelength conversion module 114 and the beam splitter BS in FIG. 1. For instance, the filter module 116 may be disposed between the lens element L1 and the lens element L2, but the invention is not limited thereto. In an embodiment, when the filter module 116 and the optical wavelength conversion module 114 are independently disposed, the filter module 116 and the optical wavelength conversion module 114 rotate synchronously.

With reference to FIG. 1 and FIG. 2A, when the filter module 116 is disposed closer to the optical wavelength conversion module 114, the size of a speckle on the filter module 116 becomes more similar to the size of a speckle on the optical wavelength conversion module 114. In addition, when the filter module 116 is disposed closer to the beam splitter BS, the size of the speckle on the filter module 116 becomes larger. In other words, the size of the speckle on the filter module 116 is greater than or equal to the size of the speckle on the optical wavelength conversion module 114. In this embodiment, the size of the speckle on the filter module 116 may be reduced by disposing the filter module 116 adjacent to the optical wavelength conversion module 114, such that a shift in transmission spectrum of the filter module 116 is effectively prevented.

Figure 3:
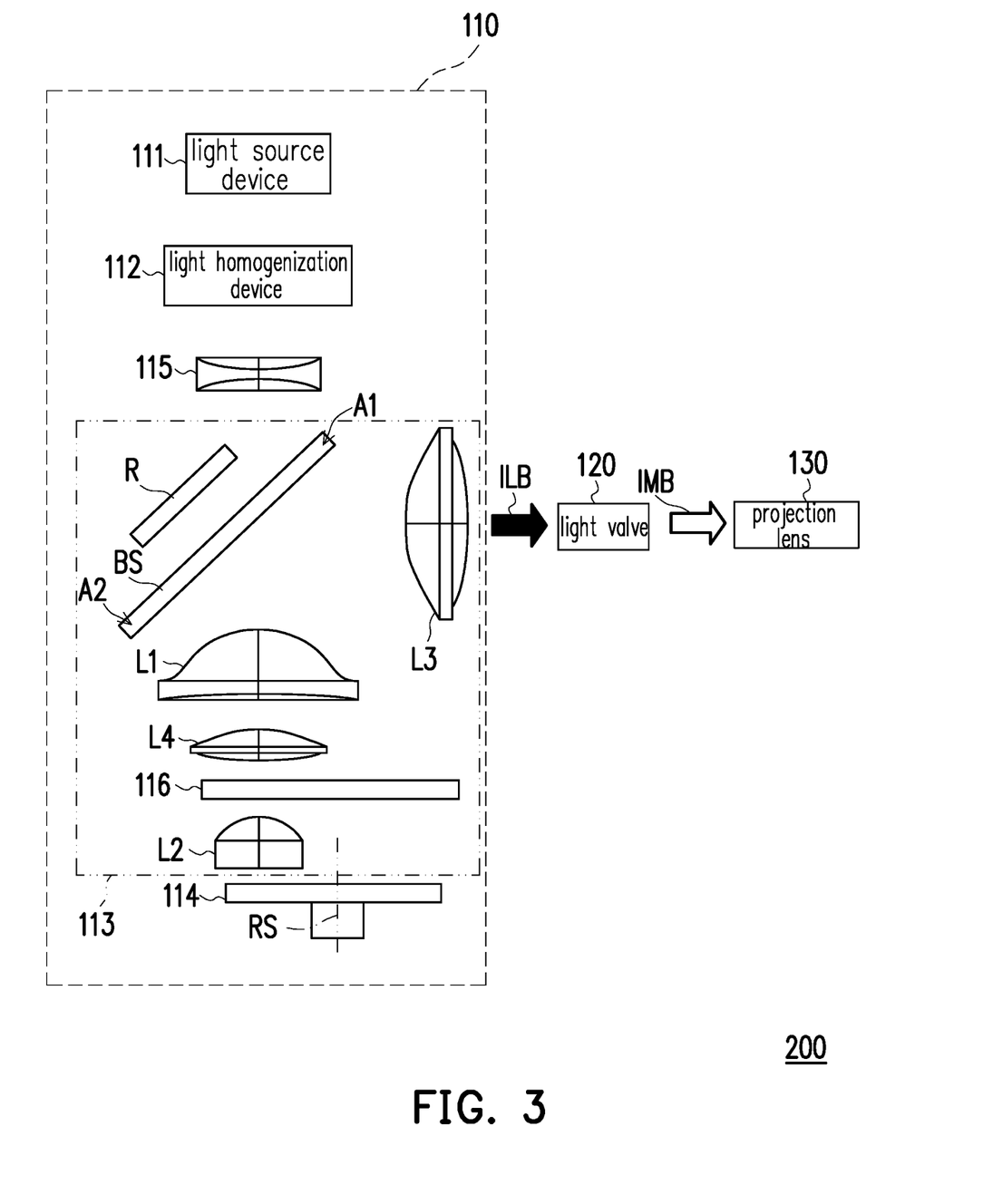
FIG. 3 and FIG. 4 are respectively schematic views of projection apparatuses according to other embodiments of the invention.
Figure 4:
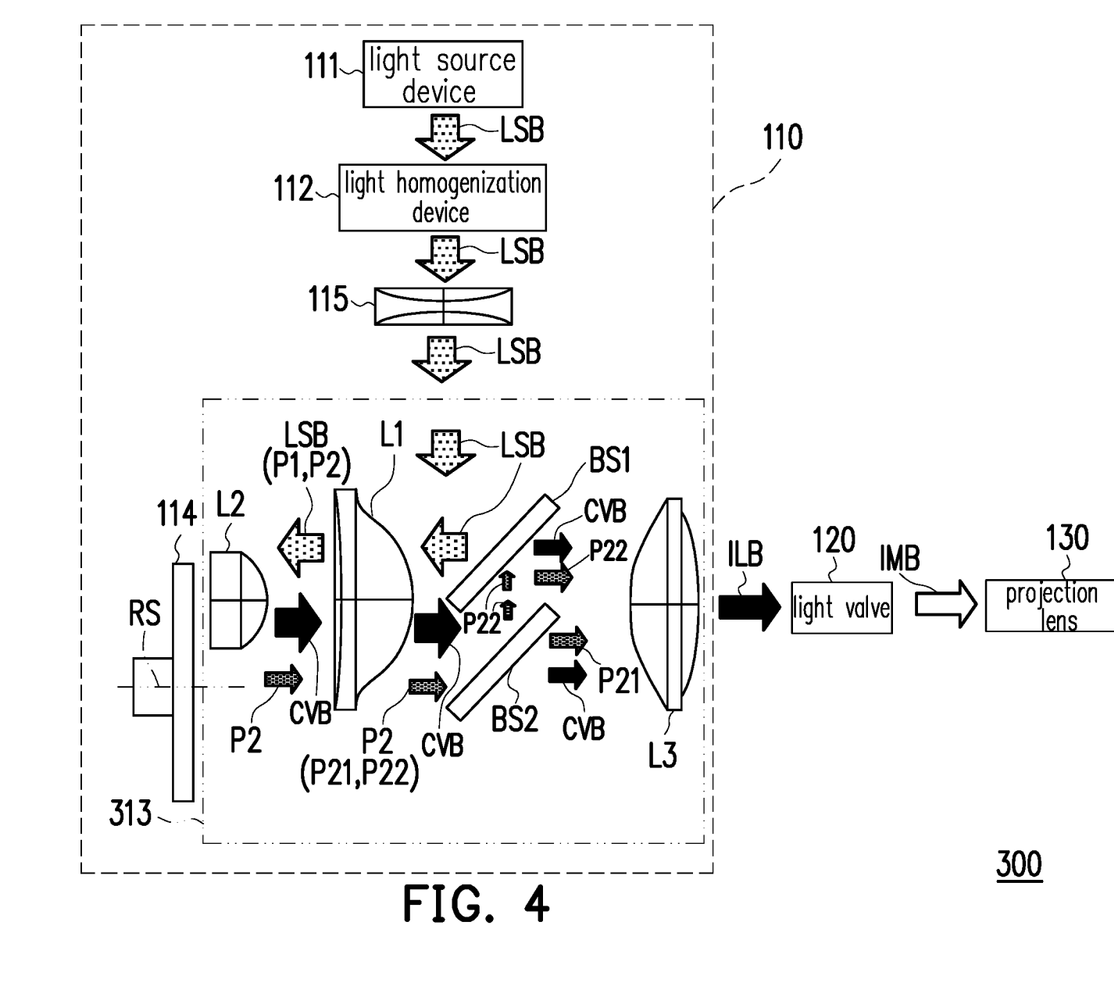

FIG. 3 and FIG. 4 are respectively schematic views of projection apparatuses according to other embodiments of the invention. In FIG. 3 and FIG. 4, identical elements are denoted by the same reference numerals, and details thereof will not be repeated hereinafter.

With reference to FIG. 3, a difference between a projection apparatus 200 and the projection apparatus 100 of FIG. 1 may be described as follows. In the projection apparatus 200, the illumination system 110 further includes the filter module 116, and the filter module 116 is disposed between the lens element L1 and the lens element L2. In addition, the optical transmission module 113 further includes a lens element L4, and the lens element L4 is disposed between the lens element L1 and the filter module 116.

With reference to FIG. 4, a difference between a projection apparatus 300 and the projection apparatus 100 of FIG. 1 may be described as follows. In the projection apparatus 300, the optical wavelength conversion module 114 and the light valve 120 are respectively located at two opposite sides of an optical transmission module 313. The optical transmission module 313 includes a first beam splitter BS1 and a second beam splitter BS2. The beam splitter BS and the reflector R of FIG. 1 are not included in the optical transmission module 313. The optical transmission module 313 includes the lens element L1, the lens element L2, and the lens element L3 as well.

The first beam splitter BS1 is disposed on the transmission path of the light source beam LSB from the light homogenization device 112 and is configured for reflecting the entire light source beam LSB. The first beam splitter BS1 is configured for reflecting the first portion P1 and the second portion P2 of the light source beam LSB, such that the first portion P1 and the second portion P2 of the light source beam LSB are transmitted towards the optical wavelength conversion module 114. The optical wavelength conversion module 114 is configured for converting the first portion P1 of the light source beam LSB from the first beam splitter BS1 into the converted light beam CVB. The optical wavelength conversion module 114 is further configured for transmitting the converted light beam CVB to the first beam splitter BS1 and the second beam splitter BS2, and the optical wavelength conversion module 114 is configured for transmitting the second portion P2 of the light source beam LSB, which is not converted by the optical wavelength conversion module 114, to the second beam splitter BS2. The first beam splitter BS1 and the second beam splitter BS2 are configured for allowing the converted light beam CVB to pass through. The second beam splitter BS2 is configured for allowing the first sub-portion P21 in the second portion P2 of the light source beam LSB from the optical wavelength conversion module 114 to pass through and is configured for reflecting the second sub-portion P22 in the second portion P2 of the light source beam LSB from the optical wavelength conversion module 114 to the first beam splitter BS1. In other words, for the light source beam LSB, the second beam splitter BS2 is a partially penetrating and partially reflective element. The first beam splitter BS1 is further configured for reflecting the second sub-portion P22 in the second portion P2 of the light source beam LSB from the second beam splitter BS2.

In the structure presented in FIG. 4, the projection apparatus 300 may further include the filter module 116 illustrated in FIG. 2A. Further, the filter module 116 may be disposed between the optical wavelength conversion module 114 and the first beam splitter BS1 and may be disposed between the optical wavelength conversion module 114 and the second beam splitter BS2, but the invention is not limited thereto. In an embodiment, the filter module 116 may be disposed on the optical wavelength conversion module 114. In an embodiment, the filter module 116 may be independently disposed between multiple lens elements, for example, between the lens element L1 and the lens element L2, but the invention is not limited thereto. In an embodiment, an anti-reflection layer may be further disposed on the first beam splitter BS1/the second beam splitter BS2. The anti-reflection layer is located between the first beam splitter BS1 and the light valve 120, and the anti-reflection layer is located between the second beam splitter BS2 and the light valve 120. In this way, loss caused by surface reflection may be reduced.

In view of the foregoing, the embodiments of the invention have at least one of the following advantages or effects. In the projection apparatus provided by the embodiments of the invention, the light source beam from the light source device is optimized (light homogenization and shaping) by the light homogenization device and the optical transmission module before being transmitted to the optical wavelength conversion module. As such, the shape of the speckle formed on the optical wavelength conversion module matches with the shape of the speckle formed on the light valve. Hence, a light homogenization element and an optical system may be omitted between the optical wavelength conversion module and the light valve, such that loss of efficiency, costs, and volume may be effectively reduced in the projection apparatus provided by the embodiments of the invention. In addition, since the speckle formed on the optical wavelength conversion module has a more uniform light shape, the conversion efficiency of the optical wavelength conversion module is increased, and the optical conversion layer in the optical wavelength conversion module is also avoided from being burned out. In an embodiment, the rotary disc of the optical wavelength conversion module may be made of a material featuring a high reflection rate, or a reflection layer may be formed on the rotary disc of the optical wavelength conversion module, so that additional elements configured for transmitting the light source beam back to the optical transmission module may be omitted. In this way, the costs and volume of the projection apparatus may be further reduced, and efficiency may be improved. In another embodiment, a filter module disposed between the optical wavelength conversion module and the beam splitter may be further included in the illumination system, and a shift in the transmission spectrum of the filter module may be effectively prevented by disposing the filter module adjacent to the optical wavelength conversion module. In still another embodiment, an anti-reflection layer may be formed on the surface of the beam splitter, so as to reduce the loss caused by surface reflection.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. A projection apparatus, comprising:
   an illumination system, comprising a light source device, a light homogenization device, an optical transmission module, and an optical wavelength conversion module, wherein the light source device is configured to provide a light source beam, the light homogenization device is disposed on a transmission path of the light source beam from the light source device, the optical transmission module is disposed on a transmission path of the light source beam from the light homogenization device, the optical wavelength conversion module is disposed on a transmission path of the light source beam from the optical transmission module and is configured to convert a first portion of the light source beam into a converted light beam, wherein a wavelength of the converted light beam is different from a wavelength of the light source beam, and the converted light beam and a second portion of the light source beam form an illumination light beam, and wherein the light homogenization device is disposed outside a transmission path of the illumination light beam;
   a light valve, disposed on the transmission path of the illumination light beam and configured to convert the illumination light beam into an image light beam; and
   a projection lens, disposed on a transmission path of the image light beam, wherein no light homogenization device is disposed between the optical wavelength conversion module and the light valve such that a shape of a speckle on the light valve is substantially equal to or similar to a shape of a speckle on the optical wavelength conversion module,
   wherein the optical wavelength conversion module and the light valve are respectively located at two adjacent sides of the optical transmission module, the optical transmission module comprises a beam splitter and a reflector, the beam splitter is disposed on the transmission path of the light source beam from the light homogenization device, a partial region of the beam splitter is configured for allowing the first portion and the second portion of the light source beam to pass through, another partial region of the beam splitter is configured for allowing a partial light beam of the second portion of the light source beam to pass through and is configured for reflecting another partial light beam of the second portion of the light source beam, the reflector is disposed on a transmission path of the light source beam from the beam splitter, the reflector is configured for reflecting the light source beam from the beam splitter back to the beam splitter, the optical wavelength conversion module is disposed on a transmission path of the light source beam passing through the beam splitter, the optical wavelength conversion module is configured for converting the first portion of the light source beam into the converted light beam and transmitting the converted light beam back to the beam splitter, and the beam splitter is further configured for reflecting the converted light beam.

2. The projection apparatus as claimed in claim 1, wherein the light homogenization device comprises a diffraction optical element, a holographic optical element, an integration rod, a lens array element, or a combination of the lens array element and a convex lens.

3. The projection apparatus as claimed in claim 2, wherein two opposite surfaces of the lens array element are lens array surfaces, or the two opposite surfaces of the lens array element are respectively a lens array surface and a convex surface.

4. The projection apparatus as claimed in claim 1, wherein the light homogenization device comprises a lens array element or a combination of the lens array element and a convex lens, the light source device comprises a plurality of light emitting elements, a plurality of sub-beams emitted by plurality of the light emitting elements form the light source beam, and the light homogenization device converges the light source beam and a plurality of speckles formed by the plurality of sub-beams are overlapped with one another by using the light homogenization device.

5. The projection apparatus as claimed in claim 1, wherein the illumination system further comprises a concave lens, the light homogenization device converges the light source beam from the light source device to the concave lens, and the concave lens collimates the light source beam from the light homogenization device and transmits the collimated light source beam towards the optical transmission module.

6. The projection apparatus as claimed in claim 1, wherein the illumination system further comprises a concave lens, the concave lens is disposed on the transmission path of the light source beam from the light source device, and the concave lens collimates the light source beam converged to the concave lens and transmits the collimated light source beam towards the light homogenization device.

7. The projection apparatus as claimed in claim 1, wherein the illumination system further comprises:
 a filter module, disposed between the optical wavelength conversion module and the beam splitter, wherein a size of a speckle on the filter module is greater than or equal to a size of the speckle on the optical wavelength conversion module.

8. A projection apparatus, comprising:
 an illumination system, comprising a light source device, a light homogenization device, an optical transmission module, and an optical wavelength conversion module, wherein the light source device is configured to provide a light source beam, the light homogenization device is disposed on a transmission path of the light source beam from the light source device, the optical transmission module is disposed on a transmission path of the light source beam from the light homogenization device, the optical wavelength conversion module is disposed on a transmission path of the light source beam from the optical transmission module and is configured to convert a first portion of the light source beam into a converted light beam, wherein a wavelength of the converted light beam is different from a wavelength of the light source beam, and the converted light beam and a second portion of the light source beam form an illumination light beam, and wherein the light homogenization device is disposed outside a transmission path of the illumination light beam;
 a light valve, disposed on the transmission path of the illumination light beam and configured to convert the illumination light beam into an image light beam; and
 a projection lens, disposed on a transmission path of the image light beam, wherein no light homogenization device is disposed between the optical wavelength conversion module and the light valve such that a shape of a speckle on the light valve is substantially equal to or similar to a shape of a speckle on the optical wavelength conversion module,
 wherein the optical wavelength conversion module and the light valve are respectively located at two opposite sides of the optical transmission module, the optical transmission module comprises a first beam splitter and a second beam splitter, the first beam splitter is disposed on the transmission path of the light source beam from the light homogenization device, the first beam splitter is configured for reflecting the light source beam to enable the light source beam to be transmitted towards the optical wavelength conversion module, the optical wavelength conversion module is configured for converting the first portion of the light source beam from the first beam splitter into the converted light beam, the optical wavelength conversion module is further configured for transmitting the converted light beam to the first beam splitter and the second beam splitter, the optical wavelength conversion module is further configured for transmitting the second portion of the light source beam which is not converted by the optical wavelength conversion module to the second beam splitter, the first beam splitter and the second beam splitter are further configured for allowing the converted light beam to pass through, the second beam splitter is configured for allowing a first sub-portion in the second portion of the light source beam from the optical wavelength conversion module to pass through, the second beam splitter is further configured for reflecting a second sub-portion in the second portion of the light source beam from the optical wavelength conversion module to the first beam splitter, and the first beam splitter is further configured for reflecting the second sub-portion in the second portion of the light source beam from the second beam splitter.

9. The projection apparatus as claimed in claim 8, wherein the illumination system further comprises:
 a filter module, disposed between the optical wavelength conversion module and the first beam splitter and between the optical wavelength conversion module and the second beam splitter, wherein a size of a speckle on the filter module is greater than or equal to a size of the speckle on the optical wavelength conversion module.

10. An illumination system, comprising:
 a light source device, configured for providing a light source beam;
 a light homogenization device, disposed on a transmission path of the light source beam from the light source device;
 an optical transmission module, disposed on a transmission path of the light source beam from the light homogenization device;
 an optical wavelength conversion module, disposed on a transmission path of the light source beam from the optical transmission module and configured to convert a first portion of the light source beam into a converted light beam, wherein a wavelength of the converted light beam is different from a wavelength of the light source beam, and the converted light beam and a second portion of the light source beam form an illumination light beam, and wherein the light homogenization device is disposed outside a transmission path of the illumination light beam; and
 a light valve, disposed on the transmission path of the illumination light beam, wherein no light homogenization device is disposed between the optical wavelength conversion module and the light valve such that a shape of a speckle on the light valve is substantially equal to or similar to a shape of a speckle on the optical wavelength conversion module, wherein the optical wavelength conversion module and the light valve are respectively located at two adjacent sides of the optical transmission module, the optical transmission module comprises a beam splitter and a reflector, the beam splitter is disposed on the transmission path of the light source beam from the light homogenization device, a partial region of the beam splitter is configured for allowing the first portion and the second portion of the light source beam to pass through, another partial region of the beam splitter is configured for allowing a partial light beam of the second portion of the light source beam to pass through and is configured for reflecting another partial light beam of the second portion of the light source beam, the reflector is disposed on a transmission path of the light source beam from the beam splitter, the reflector is configured for reflecting the light source beam from the beam splitter back to the beam splitter, the optical wavelength conversion module is disposed on a transmission path of the light source beam passing through the beam splitter, the optical wavelength conversion module is configured for converting the first portion of the light source beam into the converted light beam and transmitting the converted light beam back to the beam splitter, and the beam splitter is further configured for reflecting the converted light beam.

11. A projection apparatus, comprising:
an illumination system, comprising a light source device, a light homogenization device, an optical transmission module, and an optical wavelength conversion module, wherein the light source device is configured to provide a light source beam, the light homogenization device is disposed on a transmission path of the light source beam from the light source device, the optical transmission module is disposed on a transmission path of the light source beam from the light homogenization device, the optical wavelength conversion module is disposed on a transmission path of the light source beam from the optical transmission module and is configured to convert a first portion of the light source beam into a converted light beam, wherein a wavelength of the converted light beam is different from a wavelength of the light source beam, and the converted light beam and a second portion of the light source beam form an illumination light beam, and wherein the light homogenization device is disposed outside a transmission path of the illumination light beam;
a light valve, disposed on the transmission path of the illumination light beam and configured to convert the illumination light beam into an image light beam; and
a projection lens, disposed on a transmission path of the image light beam,
wherein the optical wavelength conversion module and the light valve are respectively located at two adjacent sides of the optical transmission module, the optical transmission module comprises a beam splitter and a reflector, the beam splitter is disposed on the transmission path of the light source beam from the light homogenization device, a partial region of the beam splitter is configured for allowing the first portion and the second portion of the light source beam to pass through, another partial region of the beam splitter is configured for allowing a partial light beam of the second portion of the light source beam to pass through and is configured for reflecting another partial light beam of the second portion of the light source beam, the reflector is disposed on a transmission path of the light source beam from the beam splitter, the reflector is configured for reflecting the light source beam from the beam splitter back to the beam splitter, the optical wavelength conversion module is disposed on a transmission path of the light source beam passing through the beam splitter, the optical wavelength conversion module is configured for converting the first portion of the light source beam into the converted light beam and transmitting the converted light beam back to the beam splitter, and the beam splitter is further configured for reflecting the converted light beam.

12. A projection apparatus, comprising:
an illumination system, comprising a light source device, a light homogenization device, an optical transmission module, and an optical wavelength conversion module, wherein the light source device is configured to provide a light source beam, the light homogenization device is disposed on a transmission path of the light source beam from the light source device, the optical transmission module is disposed on a transmission path of the light source beam from the light homogenization device, the optical wavelength conversion module is disposed on a transmission path of the light source beam from the optical transmission module and is configured to convert a first portion of the light source beam into a converted light beam, wherein a wavelength of the converted light beam is different from a wavelength of the light source beam, and the converted light beam and a second portion of the light source beam form an illumination light beam, and wherein the light homogenization device is disposed outside a transmission path of the illumination light beam;
a light valve, disposed on the transmission path of the illumination light beam and configured to convert the illumination light beam into an image light beam; and
a projection lens, disposed on a transmission path of the image light beam,
wherein the optical wavelength conversion module and the light valve are respectively located at two opposite sides of the optical transmission module, the optical transmission module comprises a first beam splitter and a second beam splitter, the first beam splitter is disposed on the transmission path of the light source beam from the light homogenization device, the first beam splitter is configured for reflecting the light source beam to enable the light source beam to be transmitted towards the optical wavelength conversion module, the optical wavelength conversion module is configured for converting the first portion of the light source beam from the first beam splitter into the converted light beam, the optical wavelength conversion module is further configured for transmitting the converted light beam to the first beam splitter and the second beam splitter, the optical wavelength conversion module is further configured for transmitting the second portion of the light source beam which is not converted by the optical wavelength conversion module to the second beam splitter, the first beam splitter and the second beam splitter are further configured for allowing the converted light beam to pass through, the second beam splitter is configured for allowing a first sub-portion in the second portion of the light source beam from the optical wavelength conversion module to pass through, the second beam splitter is further configured for reflecting a second sub-portion in the second portion of the light source beam from the optical wavelength conversion module to the first beam splitter, and the first beam splitter is further configured for reflecting the second sub-portion in the second portion of the light source beam from the second beam splitter.

* * * * *